US009521091B2

(12) United States Patent
Tatsumi et al.

(10) Patent No.: US 9,521,091 B2
(45) Date of Patent: Dec. 13, 2016

(54) RELAY SYSTEM AND SWITCHING DEVICE

(71) Applicant: Hitachi Metals, Ltd., Minato-ku, Tokyo (JP)

(72) Inventors: Tomoyoshi Tatsumi, Tsuchiura (JP); Hiroshi Ishizaki, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 85 days.

(21) Appl. No.: 14/530,989

(22) Filed: Nov. 3, 2014

(65) Prior Publication Data
US 2015/0207670 A1  Jul. 23, 2015

(30) Foreign Application Priority Data

Jan. 22, 2014  (JP) .................................... 2014-9907

(51) Int. Cl.
*H04L 12/24*  (2006.01)
*H04L 12/933*  (2013.01)
*H04L 12/939*  (2013.01)

(52) U.S. Cl.
CPC ......... *H04L 49/1515* (2013.01); *H04L 49/555* (2013.01)

(58) Field of Classification Search
CPC ..... H04L 49/1515; H04L 49/00; H04L 49/555
See application file for complete search history.

(56) References Cited

U.S. PATENT DOCUMENTS

| 2006/0080430 A1* | 4/2006 | Barsuk ............... H04L 12/2602 709/224 |
| 2009/0086663 A1* | 4/2009 | Ho ....................... H04W 40/32 370/328 |
| 2013/0022044 A1 | 1/2013 | Tatsumi et al. |
| 2013/0077622 A1* | 3/2013 | Tatsumi ............. H04L 12/2867 370/386 |

FOREIGN PATENT DOCUMENTS

JP   2013-26708 A   2/2013

* cited by examiner

*Primary Examiner* — Donald Mills
*Assistant Examiner* — Henry Baron
(74) *Attorney, Agent, or Firm* — Crowell & Moring LLP

(57) ABSTRACT

When a fabric switch detects a fault in its own link, the fabric switch transmits a first fault notification frame containing a fault link identifier representing the detected fault to a plurality of port switches. When the fabric switch receives a second fault notification frame from a plurality of port switches, it floods the second fault notification frame. When a port switch detects a fault in its own link, it transmits a second fault notification frame containing a fault link identifier to the plurality of fabric switches. Also, when the port switch receives the fault notification frame at all of its own links, it sets the LAG based on the fault link identifier.

10 Claims, 14 Drawing Sheets

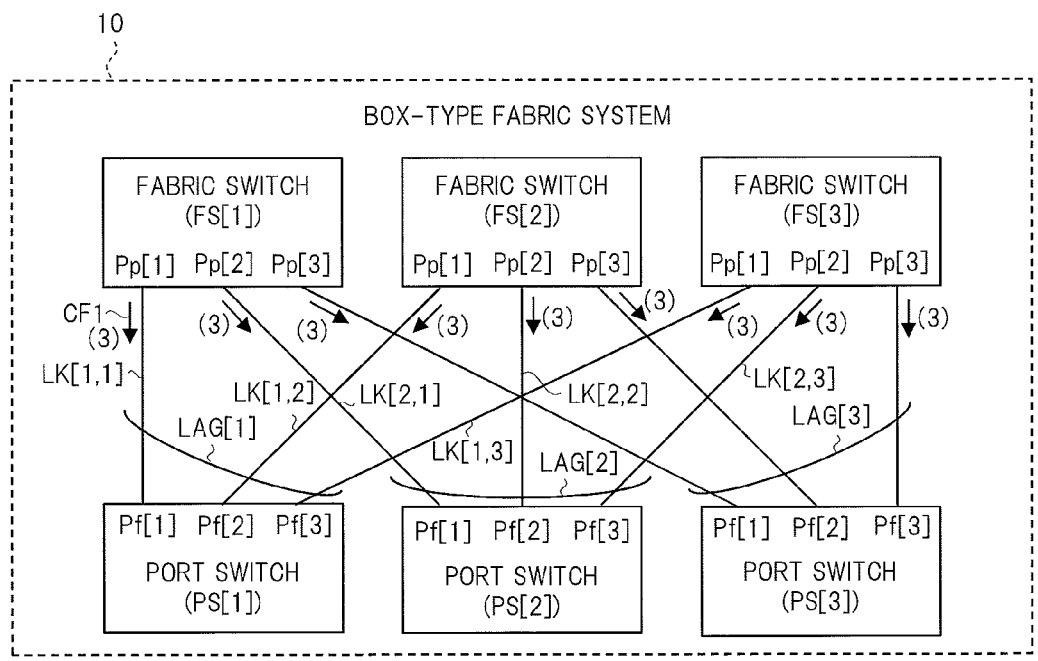

CONNECTION INFORMATION
TABLE OF PS[2]

| PORT IDENTIFIER | NUMBER OF SWITCHES |
|---|---|
| {Pf[1]} | TWO |
| {Pf[2]} | THREE |
| {Pf[3]} | THREE |

FIG. 11A

34  LAG TABLE

| LAG-ID | PORT ID |
|---|---|
| {LAG[n]} | {Pf[1]} |
| | ... |
| | {Pf[m]} |

FIG. 11B

FDB1: ADDRESS TABLE

| PORT ID/LAG-ID | MAC ADDRESS |
|---|---|
| {Pu[1]} | MAxx |
| ... | ... |
| {Pu[p]} | MAyy |
| {LAG[n]} | MAzz,··· |

FIG. 13A

45 PS MANAGEMENT TABLE

| PORT ID | PS-ID |
|---|---|
| {Pp[1]} | {PS[1]} |
| ... | ... |
| {Pp[n]} | {PS[n]} |

FIG. 13B

FDB2: ADDRESS TABLE

| PORT ID/LAG ID | MAC ADDRESS |
|---|---|
| {Pp[1]} | MAii,··· |
| ... | ... |
| {Pp[n]} | MAjj,··· |

RELAY SYSTEM AND SWITCHING DEVICE

CROSS-REFERENCE TO RELATED APPLICATION

The present application claims priority from Japanese Patent Application No. 2014-9907 filed on Jan. 22, 2014, the content of which is hereby incorporated by reference into this application.

TECHNICAL FIELD OF THE INVENTION

The present invention relates to a relay system and a switching device, for example, a relay system in which a link aggregation is applied to the communication directed from one switching device to a plurality of switching devices.

BACKGROUND OF THE INVENTION

For example, Japanese Patent Application Laid-Open Publication No. 2013-26708 (Patent Document 1) discloses a method which makes lower switches automatically set a link aggregation group (hereinafter, abbreviated as LAG) in a network system having a plurality of upper switches and a plurality of lower switches. Concretely, each upper switch transmits a control frame containing the number of lower switches connected to itself to each lower switch, and each lower switch sets the LAG to ports which have received the control frames containing the largest number of lower switches among the numbers of lower switches contained in the control frames.

SUMMARY OF THE INVENTION

For example, a technique of establishing a relay system by combining a plurality of box-type switching devices instead of a chassis-type switching device has been known. In this relay system, a plurality of box-type switching devices (here, referred to as port switch) and a plurality of box-type switching devices (here, referred to as fabric switch) which function to relay a frame between the port switches are provided. Each port switch has a link to each of the plurality of fabric switches, and sets a LAG to the plurality of links. In this specification, the relay system like this is referred to as a box-type fabric system.

In such a box-type fabric system, each port switch can use the method disclosed in the Patent Document 1 when setting the LAG. However, since each fabric switch transmits a control frame containing the number of port switches connected to itself at each predetermined period (for example, 1 s) and each port switch sets the LAG based on the control frame from each fabric switch, it sometimes takes a lot of time from when a fault occurs to when the setting of the LAG in accordance with the fault is completed.

The present invention has been made in view of the problem mentioned above, and one object of the present invention is to achieve the speeding up of the automatic setting of the LAG in accordance with a fault.

The above and other objects and novel characteristics of the present invention will be apparent from the description of the present specification and the accompanying drawings.

The following is a brief description of an outline of the typical embodiment of the invention disclosed in the present application.

A relay system according to the present embodiment includes: a plurality of port switches; and a plurality of fabric switches functioning to relay a frame between the plurality of port switches. Each of the plurality of port switches is connected to each of the plurality of fabric switches by links. Each of the plurality of fabric switches includes: a first fault detecting unit, a first fault notification frame generating unit and a first frame transmitting unit. The first fault detecting unit detects a fault of links connected to itself. When a fault is detected by the first fault detecting unit, the first fault notification frame generating unit generates a first fault notification frame containing a fault link identifier representing a link having the fault. The first frame transmitting unit transmits the first fault notification frame to the plurality of port switches, and floods a second fault notification frame when the second fault notification frame is received from any of the plurality of port switches. Each of the plurality of port switches includes: a second fault detecting unit; a second fault notification frame generating unit; a second frame transmitting unit; and a LAG setting unit. The second fault detecting unit detects a fault of links connected to itself. When a fault is detected by the second fault detecting unit, the second fault notification frame generating unit generates the second fault notification frame containing a fault link identifier representing a link having the fault. The second frame transmitting unit transmits the second fault notification frame to the plurality of fabric switches. When the LAG setting unit receives the first fault notification frame or the second fault notification frame at all of links connected to itself, the LAG setting unit sets LAG to the links connected to itself based on the fault link identifier contained in the received fault notification frame.

The effects obtained by typical embodiments of the invention disclosed in the present application will be briefly described below. That is, it is possible to achieve the speeding up of the automatic setting of the LAG in accordance with a fault.

BRIEF DESCRIPTIONS OF THE DRAWINGS

FIG. 2A is an explanatory diagram showing an operation example in setting the LAG by the port switch in the relay system of FIG. 1;

FIG. 2B is a schematic diagram showing a configuration example of a connection information table provided in the port switch of FIG. 2A;

FIG. 11A is a schematic diagram showing a configuration example of a LAG table in FIG. 10;

FIG. 11B is a schematic diagram showing a configuration example of an address table in FIG. 10;

FIG. 13A is a schematic diagram showing a configuration example of a PS management table in FIG. 12;

FIG. 13B is a schematic diagram showing a configuration example of an address table in FIG. 12;

DESCRIPTIONS OF THE PREFERRED EMBODIMENTS

Figure 1:
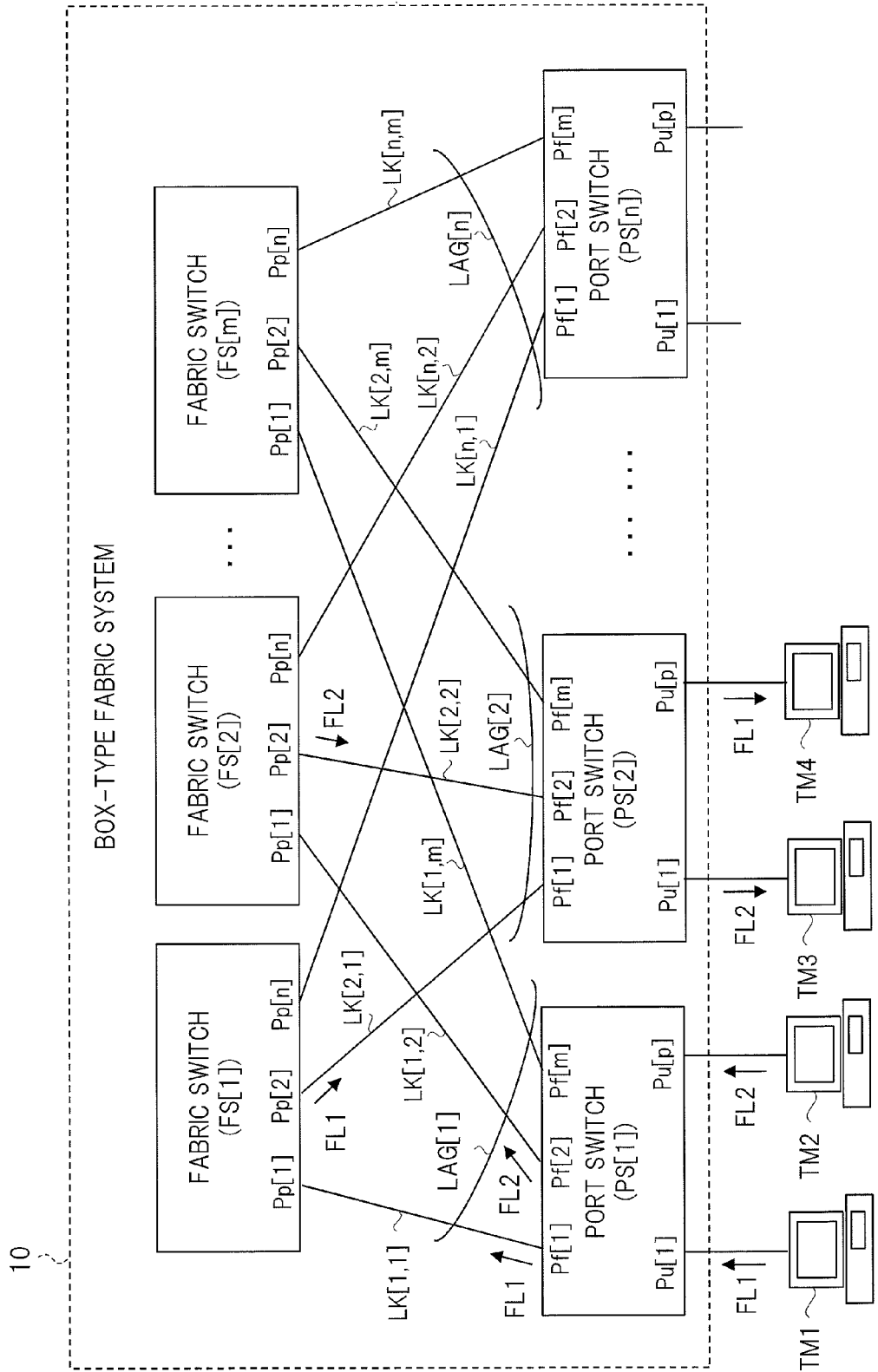
FIG. 1 is a block diagram showing a configuration example of a relay system according to the first embodiment of the present invention and an operation example to be a premise thereof.

In the embodiments described below, the invention will be described in a plurality of sections or embodiments when required as a matter of convenience. However, these sections or embodiments are not irrelevant to each other unless otherwise stated, and the one relates to the entire or apart of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference characters throughout the drawings for describing the embodiments, and the repetitive description thereof will be omitted.

First Embodiment

Configuration of Relay System and Operation to be Premise

FIG. 1 is a block diagram showing a configuration example of a relay system according to the first embodiment of the present invention and an operation example to be a premise thereof. A relay system 10 shown in FIG. 1 is made up of a box-type fabric system 10. This relay system 10 includes a plurality of (here, n (n is an integer of two or more)) port switches PS[1] to PS[n] and a plurality of (here, m (m is an integer of two or more)) fabric switches FS[1] to FS[m]. The plurality of fabric switches FS[1] to FS[m] relay frames between the plurality of port switches PS[1] to PS[n]. Each of the plurality of port switches PS[1] to PS[n] is connected to each of the plurality of fabric switches FS[1] to FS[m] by links LK[1,1] to LK[n,m].

Each of the n port switches PS[1] to PS[n] and m fabric switches FS[1] to FS[m] is made up of a box-type switching device. Each of the n port switches PS[1] to PS[n] includes m fabric-switch ports Pf[1] to Pf[m] for the connection to the m fabric switches FS[1] to FS[m] and p (p is an integer of 1 or more) user ports Pu[1] to Pu[p]. Each of the m fabric switches FS[1] to FS[m] includes n port-switch ports Pp[1] to Pp[n] for the connection to the n port switches PS[1] to PS[n].

Each of the n port switches PS[1] to PS[n] sets the LAG to m links (that is, fabric-switch ports Pf[1] to Pf[m]) which connect the port switch itself and the m fabric switches FS[1] to FS[m]. In FIG. 1, the link which connects the port switch PS[k] (k: integer of 1 to n) and the fabric switch FS[q] (q: integer of 1 to m) is referred to as LK[k,q]. The port switch PS[1] sets the LAG (referred to as LAG[1]) to m links LK[1,1] to LK[1,m] between itself and the m fabric switches FS[1] to FS[m]. Similarly, the port switch PS[2] sets the LAG (referred to as LAG[2]) to the m links LK[2,1] to LK[2,m], and the port switch PS[n] sets the LAG (referred to as LAG[n]) to the m links LK[n,1] to LK[n, m].

Hereinafter, the port switches PS[1] to PS[n] are collectively referred to as a port switch PS, and the fabric switches FS[1] to FS[m] are collectively referred to as a fabric switch FS. Also, the fabric-switch ports Pf[1] to Pf[m] are collectively referred to as a fabric-switch port Pf, and the port-switch ports Pp[1] to Pp[n] are collectively referred to as a port-switch port Pp. Furthermore, the plurality of links LK[1,1] to LK[n, m] are collectively referred to as a link LK. Here, the link LK means an assembly including a communication line and ports at its both ends (that is, the fabric-switch port Pf and the port-switch port Pp).

In the configuration described above, for example, the case where a frame (user frame) FL1 is transferred from the terminal TM1 connected to the user port Pu[1] of the port switch PS[1] to the terminal TM4 connected to the user port Pu[p] of the port switch PS[2] is assumed. In this case, when the port switch PS[1] receives the user frame FL1, it determines the fabric-switch port Pf (in other words, link LK) serving as a relay destination thereof based on a predetermined distribution rule associated with the LAG[1]. In this example, the fabric-switch port Pf[1] is determined.

As a result, the frame FL1 is transferred to the port switch PS[2] and the terminal TM4 through the route via the fabric switch FS[1].

Also, the case where a frame (user frame) FL2 is transferred from the terminal TM2 connected to the user port Pu[p] of the port switch PS[1] to the terminal TM3 connected to the user port Pu[1] of the port switch PS[2] is assumed. In this case, when the port switch PS[1] receives the frame FL2, it determines the fabric-switch port Pf (link LK) serving as a relay destination thereof based on a predetermined distribution rule associated with the LAG[1]. In this example, the fabric-switch port Pf[2] is determined. As a result, the frame FL2 is transferred to the port switch PS[2] and the terminal TM3 through the route via the fabric switch FS[2]. If the fabric-switch port Pf[2] has a fault, a fabric-switch port Pf other than that is determined.

As described above, when the box-type fabric system is used, the load distribution and redundancy in the LAG can be achieved in accordance with the LAG. For example, when it is desired to expand the communication band, it can be achieved by adding the fabric switch FS, and the expansion of the communication band can be easily achieved at low cost. Also, the number of ports (that is, user ports Pu[1] to Pu[p]) can be easily increased at low cost by adding the port switch PS. As a result, in the case of using this system, the flexible system in compliance with the demands from a user can be established at low cost compared with the case of using a system made up of a chassis-type switching device.

<<Operation in Setting LAG by Port Switch (Premise)>>

FIG. 2A is an explanatory diagram showing an operation example in setting the LAG by the port switch in the relay system of FIG. 1, and FIG. 2B is a schematic diagram showing a configuration example of a connection information table provided in the port switch PS[2] of FIG. 2A. In the example of FIG. 2A, the number (n) of the port switches PS and the number (m) of fabric switches FS are both three. FIG. 2A shows the operation example in the case where the relay system 10 has no fault.

First, as shown in FIG. 2A, each of the fabric switches FS[1] to FS[3] detects the number of port switches PS in a normal communication state from the port switches PS[1] to PS[3] connected to the fabric switches themselves. Then, each of the fabric switches FS[1] to FS[3] generates a control frame (first control frame) CF1 containing the detected number and transmits it to the plurality of port switches PS[1] to PS[3].

In the example of FIG. 2A, the fabric switches FS[1] to FS[3] detect that the number of port switches PS in a normal communication state is three. Then, the fabric switches FS[1] to FS[3] transmit the control frame CF1 containing the information that the number of switches is three to the plurality of port switches PS[1] to PS[3] through the port-switch ports Pp[1] to Pp[3].

Each of the port switches PS[1] to PS[3] receives each control frame CF1 from the plurality of fabric switches FS[1] to FS[3] through predetermined links LK (that is, fabric-switch ports Pf[1] to Pf[3]). Then, each of the port switches PS[1] to PS[3] retains the correspondence relation between the number of switches contained in each control frame CF1 and the link which has received each control frame CF1 (that is, fabric-switch port Pf) in the connection information table.

For example, the port switch PS[2] receives the control frames CF1 each containing the information that the number of switches is three at the fabric-switch ports Pf[1] to Pf[3]. In response to this, the number of three is retained in association with port identifiers {Pf[1]} to {Pf[3]} of the fabric-switch ports Pf[1] to Pf[3] in the connection information table 15 of FIG. 2B. In this specification, for example, {Pf[1]} represents an identifier (ID) of the fabric-switch port Pf[1], and {AA} similarly represents an identifier (ID) of AA in the following description.

Similarly, since the port switches PS[1] and PS[3] receive the control frames CF1 containing the information that the number of ports is three through predetermined links LK (fabric-switch ports Pf[1] to Pf[3]), the port switches PS[1] and PS[3] retain the connection information table 15 having the same information as that of FIG. 2B. Next, each of the port switches PS[1] to PS[3] detects the largest number of switches from the connection information table 15, and sets the LAG to the links LK corresponding to the largest number of switches (that is, the fabric-switch ports Pf).

In this case, the port switches PS[1] to PS[3] detect the number of three from the connection information table 15, and set the LAG to all of the links LK corresponding to the number of three (fabric-switch ports Pf[1] to Pf[3]). The port switch PS[1] sets the LAG[1] to the links LK[1,1] to LK[1,3] (that is, fabric-switch ports Pf[1] to Pf[3]). Similarly, the port switch PS[2] sets the LAG[2] to the links LK[2,1] to LK[2,3] (fabric-switch ports Pf[1] to Pf[3]), and the port switch PS[3] sets the LAG[3] to the links LK (fabric-switch ports Pf[1] to Pf[3]).

Figures 3A, 3B:
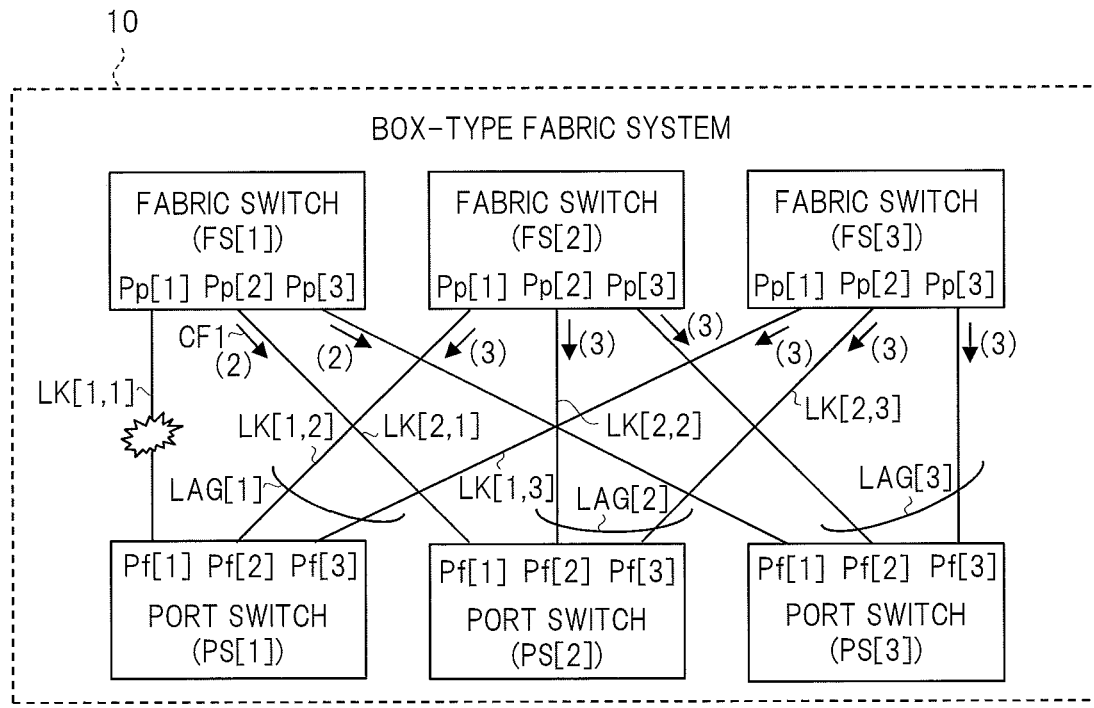
FIG. 3A is an explanatory diagram showing an operation example in a situation different from that of FIG. 2A.
FIG. 3B is a schematic diagram showing a configuration example of a connection information table provided in the port switch of FIG. 3A.

FIG. 3A is an explanatory diagram showing an operation example in a situation different from that of FIG. 2A, and FIG. 3B is a schematic diagram showing a configuration example of a connection information table provided in the port switch PS[2] of FIG. 3A. FIG. 3A shows an operation example in the case where the relay system 10 has a link fault in the link LK[1,1].

In this case, the fabric switch FS[1] detects that the number of port switches PS in a normal communication state in the port switches PS[1] to PS[3] connected to the fabric switch FS[1] itself is two. Then, the fabric switch FS[1] transmits the control frame CF1 containing the information that the number of switches is two to the plurality of port switches PS[1] to PS[3] through the port-switch ports Pp[1] to Pp[3]. At this time, the fabric switch FS[1] does not have to transmit the control frame CF1 to the link LK[1,1] having the link fault (that is, port-switch port Pp[1]).

Also, the fabric switches FS[2] and FS[3] detect that the number of port switches PS in a normal communication state is three. Then, the fabric switches FS[2] and FS[3] transmit the control frame CF1 containing the information that the number of switches is three to the plurality of port switches PS[1] to PS[3] through the port-switch ports Pp[1] to Pp[3].

Each of the port switches PS[1] to PS[3] retains the correspondence relation between the number of switches contained in each control frame CF1 and the link which has received each control frame CF1 (that is, fabric-switch port Pf) in the connection information table. For example, the port switch PS[2] receives the control frame CF1 containing the information that the number of switches is two at the fabric-switch port Pf[1] and receives the control frames CF1 containing the information that the number of switches is three at the fabric-switch ports Pf[2] and Pf[3].

In response to this, as shown in FIG. 3B, the number of two is retained in association with the port identifier {Pf[1]} and the number of three is retained in association with the port identifiers {Pf[2]} and {Pf[3]} in the connection information table 15 of the port switch PS[2]. The connection information table 15 of the port switch PS[3] also has the same information as that of FIG. 3B. Also, with respect to the connection information table 15 of the port switch PS[1], the number of three is retained in association with the port identifiers {Pf[2]} and {Pf[3]}, and though not particularly limited, the number of zero or the like is retained in association with the port identifier {Pf[1]} because the port switch PS[1] cannot receive the control frame CF1 at the fabric-switch port Pf[1].

Next, each of the port switches PS[1] to PS[3] sets the LAG based on the connection information table 15. In this case, the port switches PS[1] to PS[3] detect the number of three from the connection information table 15, and sets the LAG to the fabric-switch ports Pf[2] and Pf[3] corresponding to the number of three. More specifically, the port switch PS[1] sets the LAG[1] to the links LK[1,2] and LK[1,3] (fabric-switch ports Pf[2] and Pf[3]).

Similarly, the port switch PS[2] sets the LAG[2] to the links LK[2,2] and LK[2,3] (fabric-switch ports Pf[2] and Pf[3]) and the port switch PS[3] also sets the LAG[3] to predetermined links LK (fabric-switch ports Pf[2] and Pf[3]). In other words, the port switches PS[1] to PS[3] eliminate the fabric-switch port Pf[1] from the LAG due to the link fault of the link LK[1,1] on the basis of the state of FIG. 2A.

Figure 4:
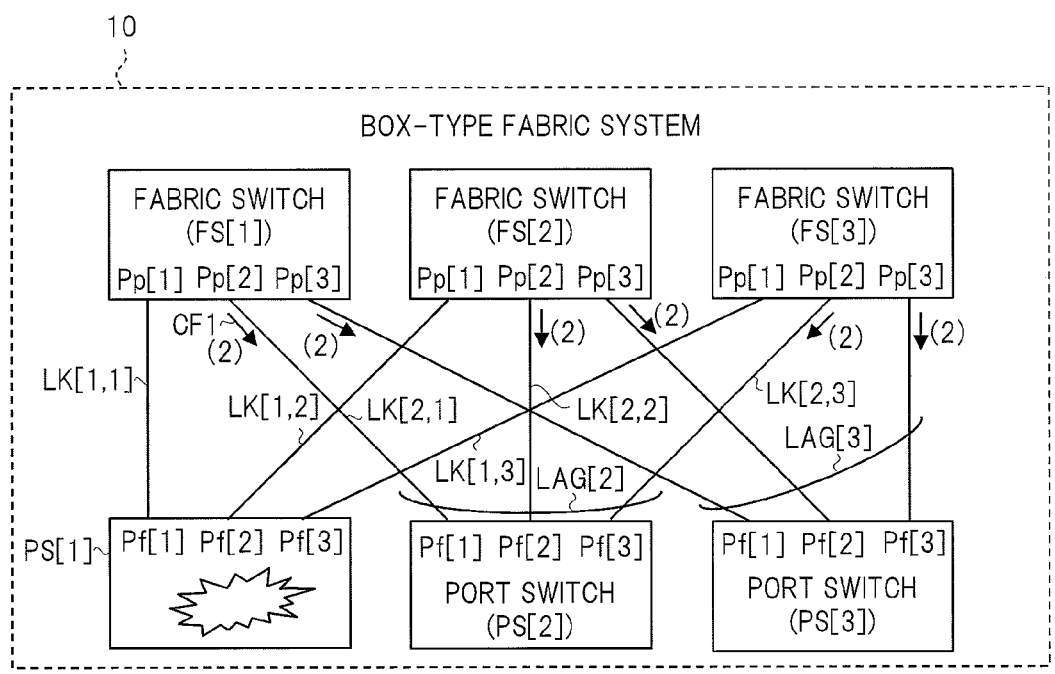
FIG. 4 is an explanatory diagram showing an operation example in a situation different from those of FIG. 2A and FIG. 3A.

FIG. 4 is an explanatory diagram showing an operation example in a situation different from those of FIG. 2A and FIG. 3A. FIG. 4 shows an operation example in the case where the relay system 10 has a fault in the port switch PS[1]. In this case, the fabric switches FS[1] to FS[3] detect that the number of port switches PS in a normal communication state is two. Then, the fabric switches FS[1] to FS[3] transmit the control frame CF1 containing the information that the number of switches is two to the plurality of port switches PS[2] and PS[3] (and PS[1]) through the port-switch ports Pp[2] and Pp[3] (and Pp[1]).

Each of the port switches PS[2] and PS[3] receives the control frames CF1 containing the information that the number of switches is two at the fabric-switch ports Pf[1] to Pf[3]. In response to this, the contents obtained by changing the numbers of "three" in FIG. 2B to the numbers of "two" are retained in the connection information tables 15 of the port switches PS[2] and PS[3]. The port switches PS[2] and PS[3] detect the number of two from the connection information table 15, and set the LAG to all of the links LK (fabric-switch ports Pf[1] to Pf[3]) corresponding to the number of two. As a result, the setting of the LAG in the port switches PS[2] and PS[3] becomes equal to that of the case in FIG. 2A having no fault.

<<Operation in Setting LAG by Port Switch (Problem)>>

Figure 5:
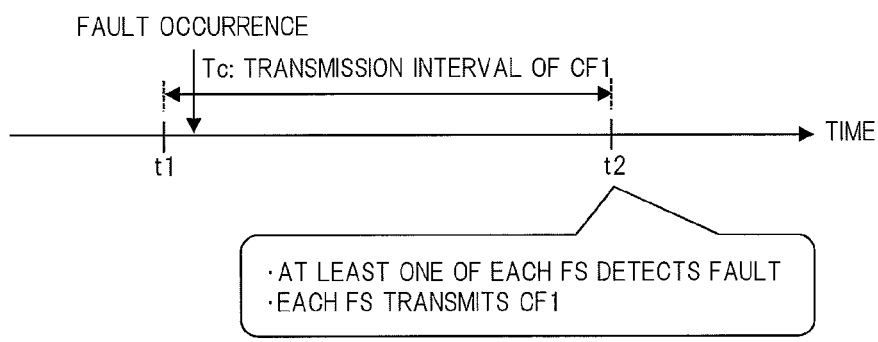
FIG. 5 is a timing chart showing an example of a problem in setting the LAG by the port switch in the relay system of FIG. 2A and others.

FIG. 5 is a timing chart showing an example of a problem in setting the LAG by the port switch in the relay system of FIG. 2A and others. Each fabric switch FS transmits the control frame CF1 shown in FIG. 2A and others at each predetermined period (Tc) as shown in FIG. 5. The transmission interval (first period) Tc of the control frame CF1 is, for example, 1s or the like. Here, for example, the case where a fault occurs immediately after the timing t1 at which the control frame CF1 is transmitted from each fabric switch FS as shown in FIG. 5 is assumed.

In this case, each port switch PS can know the occurrence of the fault when it receives the control frame CF1 from each fabric switch FS transmitted at the timing t2 after the elapse of the first period Tc from the timing t1. Then, each port switch PS sets the LAG in accordance with the situation of the occurrence of the fault as shown in FIG. 3A and FIG. 4. For this reason, depending on cases, the time longer than the first period Tc is sometimes required from when the fault occurs to when the setting of the LAG in accordance with the fault is completed. For example, when the link fault as shown in FIG. 3A has occurred, since each port switch (for example, PS[2]) transmits the user frame toward the port switch PS[1] from the fabric-switch port Pf[1] until the setting of the LAG is completed, the loss of user frame occurs.

<<Method of Detecting Number of Port Switches by Fabric Switch (Premise)>>

Figure 6:
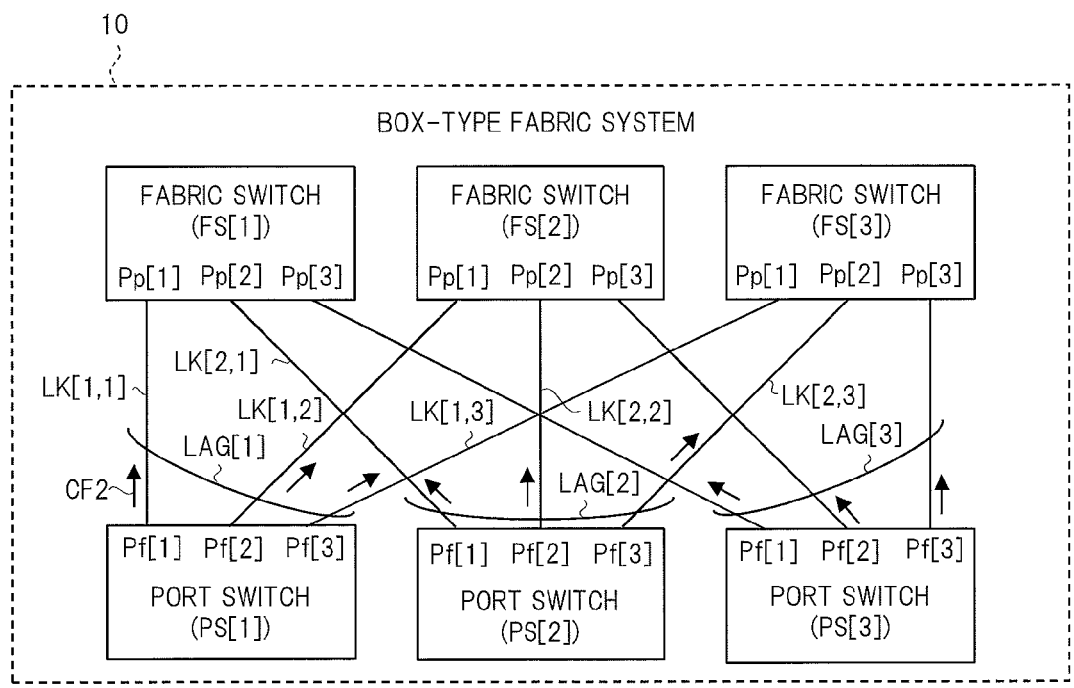
FIG. 6 is an explanatory diagram showing an operation example when the fabric switch detects the number of port switches in a normal communication state in the relay system of FIG. 2A and others.

FIG. 6 is an explanatory diagram showing an operation example when the fabric switch detects the number of port switches in a normal communication state in the relay system of FIG. 2A and others. As shown in FIG. 6, for example, each of the port switches PS[1] to PS[3] regularly transmits a control frame (second control frame) CF2 containing the identifier of the port switch PS itself to the plurality of fabric switches FS[1] to FS[3]. For example, the transmission interval of the control frame CS2 is set to the same value as the transmission interval (first period) Tc of the control frame CF1 described above.

Each of the fabric switches FS[1] to FS[3] can detect the number of port switches PS in a normal communication state in the port switches PS[1] to PS[3] based on the reception state of the control frame CF2. Concretely, each of the fabric switches FS[1] to FS[3] can detect the number of port switches PS depending on whether the control frame CF2 can be received within a predetermined period based on the transmission interval thereof.

<<Operation in Setting LAG by Port Switch (Present Embodiment)>>

Figure 7A:
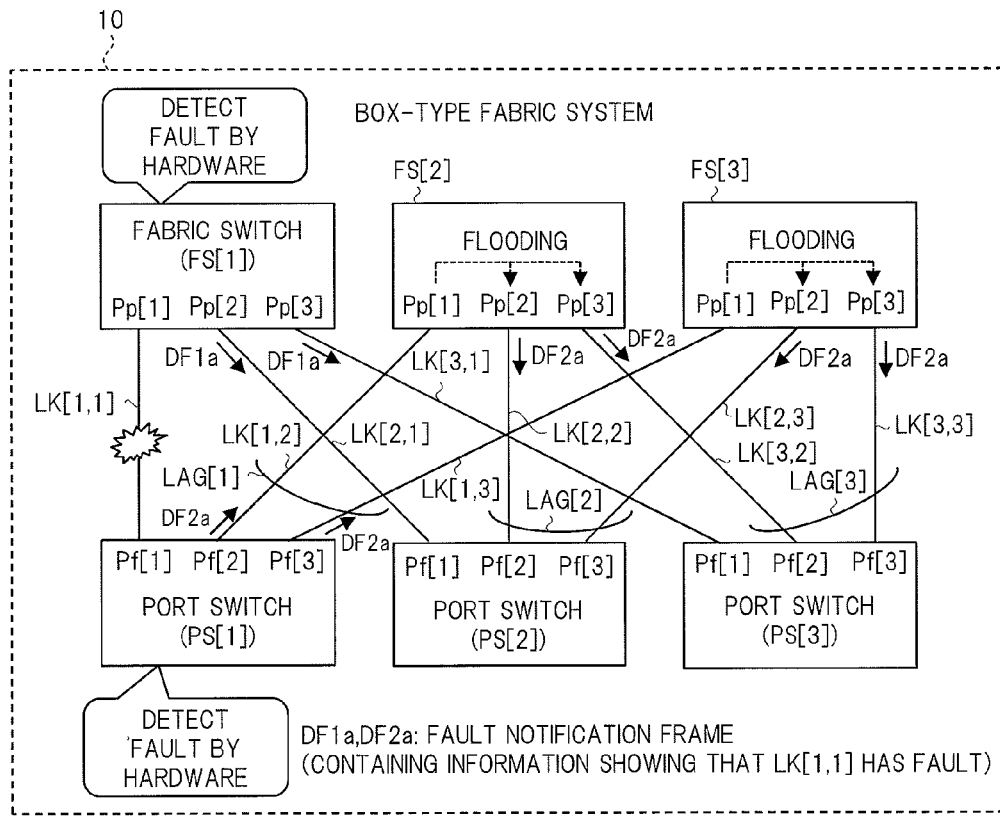
FIG. 7A is an explanatory diagram showing an operation example in setting the LAG by the port switch in the relay system according to the first embodiment of the present invention.
Figure 7B:
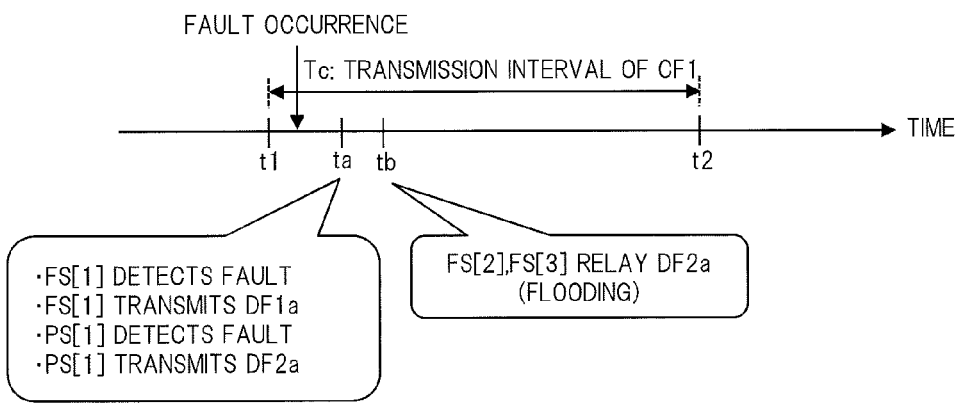
FIG. 7B is a timing chart showing an example of an operation timing of FIG. 7A.

FIG. 7A is an explanatory diagram showing an operation example in setting the LAG by the port switch in the relay system according to the first embodiment of the present invention, and FIG. 7B is a timing chart showing an example of an operation timing of FIG. 7A. FIG. 7A shows an operation example in the case where a link fault occurs in the link LK[1,1] like the case of FIG. 3A.

First, in FIG. 7A, each of the port switches PS[1] to PS[3] and fabric switches FS[1] to FS[3] detects the fault of the links LK connected to the switches themselves by a fault detecting unit made up of hardware unlike the case of FIG. 3A. Though not particularly limited, the fault detecting unit detects the fault based on the magnitude of a received signal level and the success and failure of the reception of a link pulse such as FLP (Fast Link Pulse) unlike the above-described method using the control frames CF1 and CF2. Therefore, the fault detecting unit can detect the fault in a sufficiently shorter period than the transmission interval (first period) Tc of the control frames CF1 and CF2 having a value such as 1 s, and can detect a fault in a period of, for example, several ten ms to several hundred ms though not particularly limited.

The fabric switch FS[1] detects the fault of the link LK[1,1] by its own fault detecting unit and generates a fault notification frame (first fault notification frame) DF1a containing a fault link identifier (for example, {LK[1,1]}) representing the link having the fault. Then, the fabric switch FS[1] transmits the fault notification frame DF1a to the plurality of port switches PS[2] and PS[3] (and PS[1]). Note that any identifier can be used as the fault link identifier as long as the identifier can specify the link LK[1,1]. For example, if the identifier of each link LK is directly present, the identifier can be used, and if not, an identifier capable of indirectly specifying the link LK such as the port identifier {Pp[1]} of the port Pp[1] can also be used.

The port switch PS[1] detects the fault of the link LK[1,1] by its own fault detecting unit and generates a fault notification frame (second fault notification frame) DF2a containing a fault link identifier (for example, {LK[1,1]})

representing the link having the fault. Then, the port switch PS[1] transmits the fault notification frame DF2a to the plurality of fabric switches FS[2] and FS[3]. Here, when the fabric switches FS[2] and FS[3] receive the fault notification frame DF2a, the fabric switches FS[2] and FS[3] relay the fault notification frame DF2a to the links LK (port-switch ports Pp[2] and Pp[3]) other than the link LK which has received the fault notification frame DF2a (that is, port-switch port Pp[1]). In other words, when the fabric switches FS[2] and FS[3] receive the fault notification frame DF2a, they flood it.

When the port switches PS[2] and PS[3] receive the first or second fault notification frame at all of the links connected to the port switches PS[2] and PS[3] themselves, the port switches PS[2] and PS[3] set the LAG to the links connected to themselves based on the fault link identifier contained in the fault notification frame. In this case, the port switches PS[2] and PS[3] receive the fault notification frame (first fault notification frame) DF1a at one link LK corresponding to the fabric-switch port Pf[1] and receive the fault notification frame (second fault notification frame) DF2a at the remaining two links LK corresponding to the fabric-switch ports Pf[2] and Pf[3]. Also, the fault link identifiers contained in the fault notification frames DF1a and DF2a are all the same (that is, {LK[1,1]}).

In this case, the port switches PS[2] and PS[3] determine the link fault in the link [1,1] represented by the fault link identifier ({LK[1,1]}), and set the LAG to the remaining two links LK which have received the fault notification frame DF2a. The port switch PS[2] sets the LAG[2] to the links LK[2,2] and LK[2,3] (that is, fabric-switch ports Pf[2] and Pf[3]). The port switch PS[3] sets the LAG[3] to the links LK[3,2] and LK[3,3] (fabric-switch ports Pf[2] and Pf[3]).

Note that the port switch PS[1] detects the fault of the link LK[1,1] by its own fault detecting unit, and sets the LAG[1] to the links LK[1,2] and LK[1,3] (fabric-switch ports Pf[2] and Pf[3]) except the link LK[1,1] based on the detection.

For example, the LAG setting operation shown in FIG. 7A is performed at the timings shown in FIG. 7B. In FIG. 7B, when a fault occurs, the fabric switch FS[1] and the port switch PS[1] detect the fault at the timing ta after the elapse of a period sufficiently shorter than the first period Tc shown in FIG. 5, and immediately transmit the fault notification frames (DF1a and DF2a). Then, the fabric switches FS[2] and FS[3] flood the fault notification frame DF2a at the timing tb after the elapse of a period sufficiently shorter than the first period Tc from the timing ta.

The port switches PS[2] and PS[3] can set the LAG at the time when they receive the fault notification frame DF2a. Also, for example, the port switch PS[1] can set the LAG at the timing ta. As a result, compared with the case of FIG. 5, the period from when a fault occurs to when the setting of the LAG in accordance with the fault is completed can be shortened. In other words, it is possible to achieve the speeding up of the automatic setting of the LAG in accordance with a fault. Consequently, the loss of the user frame described with reference to FIG. 5 can be reduced.

Figure 8A:
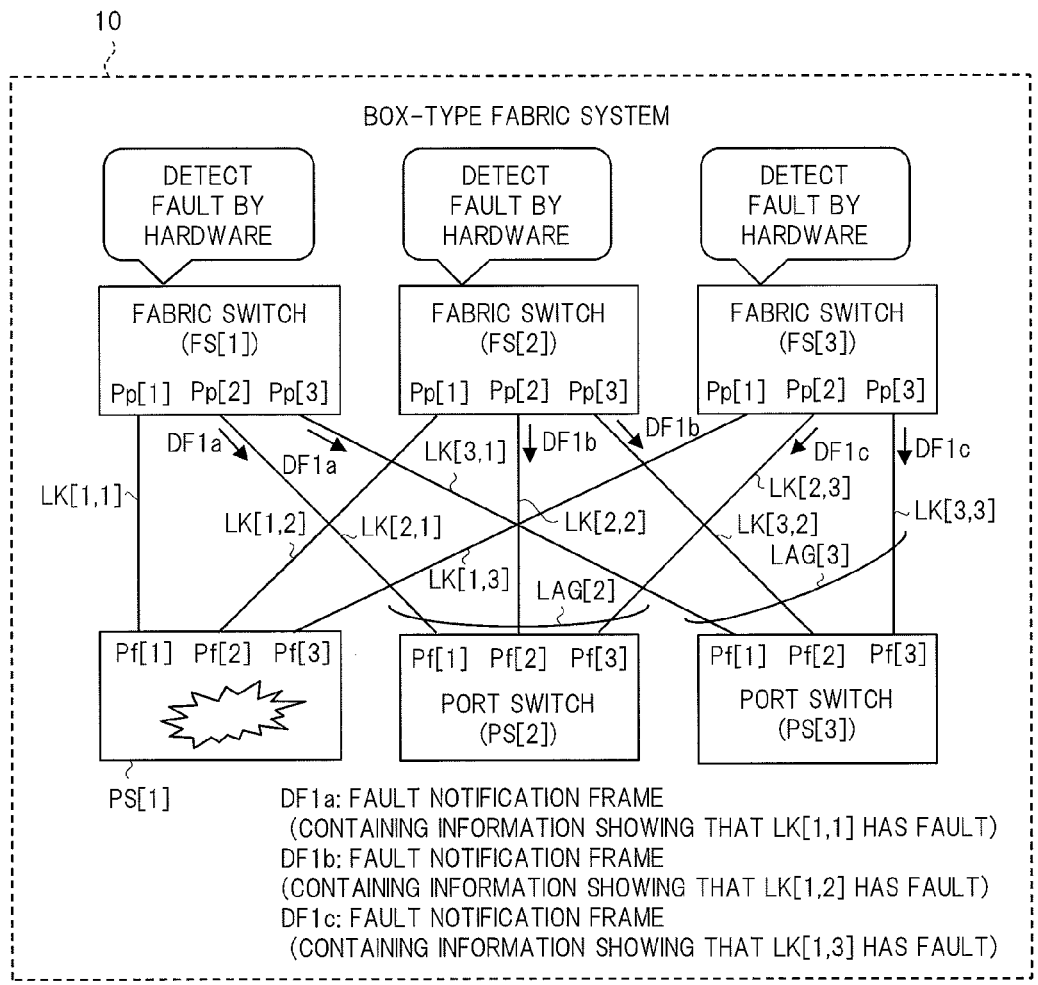
FIG. 8A is an explanatory diagram showing an operation example in setting the LAG by the port switch in a fault situation different from that of FIG. 7A.
Figure 8B:
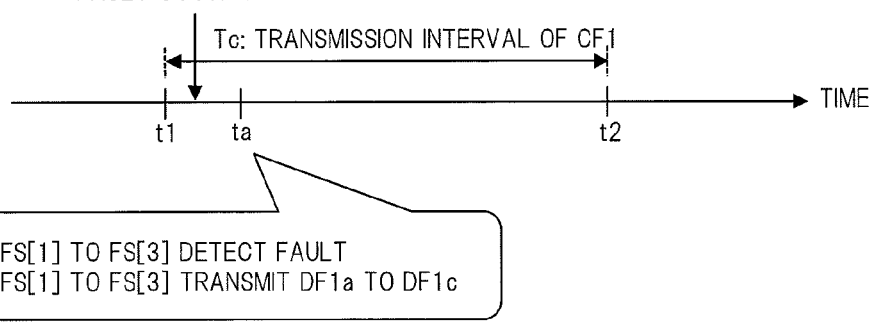
FIG. 8B is a timing chart showing an example of an operation timing of FIG. 8A.

FIG. 8A is an explanatory diagram showing an operation example in setting the LAG by the port switch in a fault situation different from that of FIG. 7A, and FIG. 8B is a timing chart showing an example of an operation timing of FIG. 8A. FIG. 8A shows an operation example in the case where a fault occurs in the port switch PS[1] like the case of FIG. 4.

In FIG. 8A, the fabric switch FS[1] detects a fault of the link LK[1,1] by its own fault detecting unit like the case of FIG. 7A, and generates a fault notification frame (first fault notification frame) DF1a containing the fault link identifier (for example, {LK[1,1]}) representing the link having the fault. Then, the fabric switch FS[1] transmits the fault notification frame DF1a to the plurality of port switches PS[2] and PS[3] (and PS[1]).

In addition, the fabric switch FS[2] also detects a fault of the link LK[1,2] by its own fault detecting unit, and generates a fault notification frame (first fault notification frame) DF1b containing the fault link identifier (for example, {LK[1,2]}) representing the link having the fault. Then, the fabric switch FS[2] transmits the fault notification frame DF1b to the plurality of port switches PS[2] and PS[3] (and PS[1]). Similarly, the fabric switch FS[3] also detects a fault of the link LK[1,3], and generates a fault notification frame (first fault notification frame) DF1c containing the fault link identifier (for example, {LK[1,3]}). Then, the fabric switch FS[3] transmits the fault notification frame DF1c to the plurality of port switches PS[2] and PS[3] (and PS[1]).

When the port switches PS[2] and PS[3] receive the first or second fault notification frame at all of the links connected to the port switches PS[2] and PS[3] themselves, the port switches PS[2] and PS[3] set the LAG to the links connected to themselves based on the fault link identifier contained in the fault notification frame. In this case, the port switches PS[2] and PS[3] receive the fault notification frames (first fault notification frames) DF1a, DF1b and DF1c at all of the links LK connected to themselves (that is, fabric-switch ports Pf[1] to Pf[3]). Also, the fault link identifiers contained in the fault notification frames DF1a, DF1b and DF1c all correspond to the same port switch PS[1].

In this case, the port switches PS[2] and PS[3] determine the fault of the port switch PS[1] corresponding to the fault link identifier, and set the LAG to all of the links LK (fabric-switch ports Pf[1] to Pf[3]) connected to the port switches PS[2] and PS[3] themselves. The port switch PS[2] sets the LAG[2] to the links LK[2,1] to LK[2,3] (that is, fabric-switch ports Pf[1] to Pf[3]). The port switch PS[3] sets the LAG[3] to the links LK[3,1] to LK[3,3] (fabric-switch ports Pf[1] to Pf[3]).

For example, the LAG setting operation shown in FIG. 8A is performed at the timings shown in FIG. 8B. In FIG. 8B, when a fault occurs, the fabric switches FS[1] to FS[3] detect the fault at the timing ta after the elapse of a period sufficiently shorter than the first period Tc shown in FIG. 5, and immediately transmit the fault notification frames DF1a to DF1c. The port switches PS[2] and PS[3] can set the LAG at the time when they receive the fault notification frames DF1a to DF1c. As a result, it is possible to achieve the speeding up of the automatic setting of the LAG in accordance with a fault like the case of FIG. 7B, and the loss of the user frame can be reduced.

Note that there may be the case where each of the port switches PS[1] to PS[3] does not have the above-described fault detecting unit in the configuration and the operation of FIG. 7A and FIG. 8A. In this case, in FIG. 7A, for example, when the port switch PS[2] receives the fault notification frame DF1a from the fabric switch FS[1] and does not receive the fault notification frame from the fabric switches FS[2] and FS[3], the port switch PS[2] can determine the link fault. On the other hand, when the port switch PS[2] receives the fault notification frames from all of the fabric switches FS[1] to FS[3] like the case of FIG. 8A, the port switch PS[2] can determine the fault of the port switch PS.

However, if the case where the frame is not received is taken as a condition for the determination of the fault like this, since a certain amount of waiting time is necessary for the determination, the fault determination and the LAG setting in accordance with the fault cannot be performed at high speed in some cases. Therefore, it is beneficial to provide the fault detecting unit in each of the port switches PS[1] to PS[3] and relay the fault notification frames by the fault detecting unit through each fabric switch FS as described above.

<<Reception Process of Fault Notification Frame>>

Figure 9:
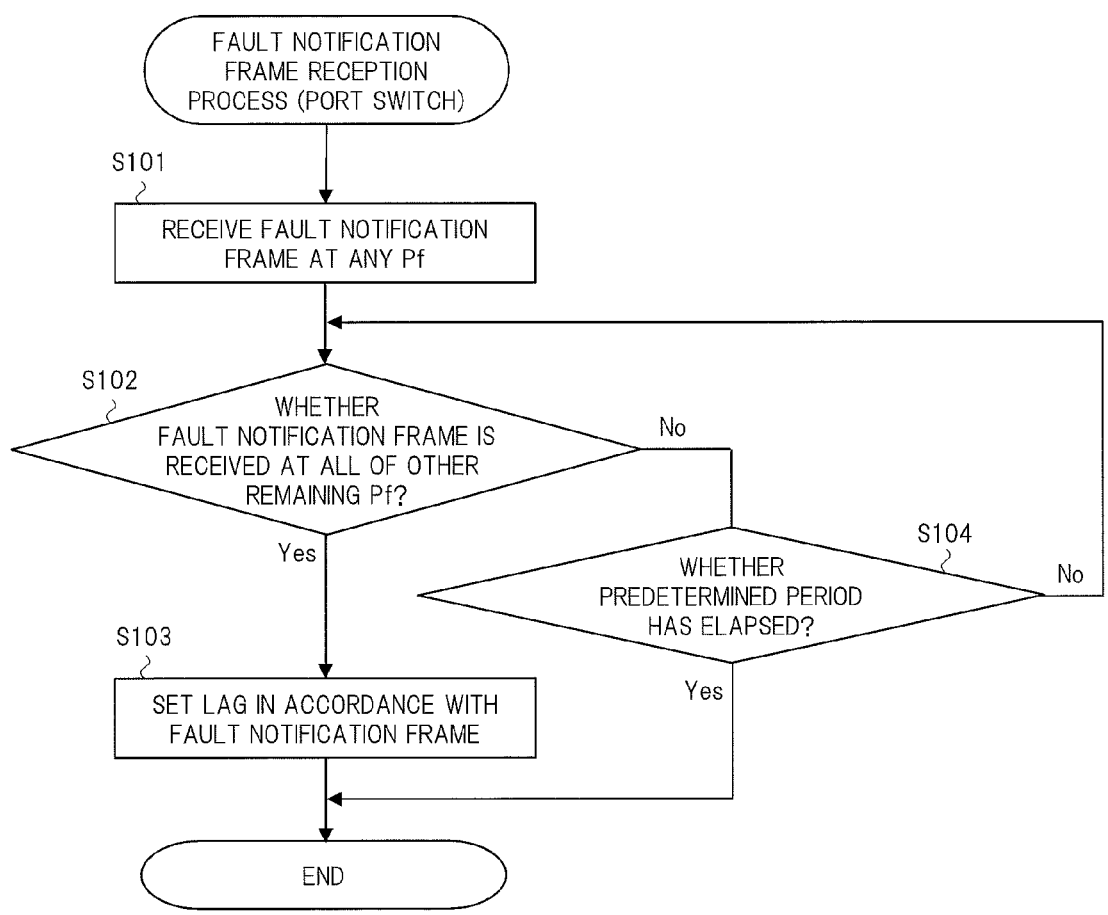
FIG. 9 is a flowchart showing an example of schematic process contents when the port switch receives a fault notification frame in the relay system of FIG. 7A and FIG. 8A.

FIG. 9 is a flowchart showing an example of schematic process contents when the port switch receives the fault notification frame in the relay system of FIG. 7A and FIG. 8A. In the fault notification frame reception process of FIG. 9, the port switch PS receives the fault notification frame (first fault notification frame) through any of the links LK (that is, each port-switch port Pf) connected to the port switch PS itself (step S101). Next, the port switch PS determines whether the fault notification frame is received at all of the other remaining port-switch ports Pf (step S102).

When the fault notification frame is received at all of the other remaining port-switch ports Pf, the port switch PS sets the LAG in accordance with the fault notification frame as shown in FIG. 7A and FIG. 8A, and then finishes the process (step S103). On the other hand, when the fault notification frame is not received at all of the other remaining port-switch ports Pf within a predetermined period, the port switch PS finishes the process (step S104). This predetermined period is shorter than the first period Tc shown in FIG. 7B and others, and may be a period half the first period Tc or less though not particularly limited.

Here, for example, there may be the case where the link fault occurs at several places instead of one place or the port switch PS can receive the fault notification frame only at some port-switch ports Pf due to some kind of trouble. In this case, the port switch PS finishes the process after the elapse of a certain amount of time without doing anything as shown in FIG. 9. Also when the fault place cannot be determined from the contents of the fault link identifier in the step S103 of FIG. 9, the process is finished without doing anything.

As described above, the LAG setting in accordance with the fault can be performed at high speed when using the fault notification frame, but on the other hand, there is a threat that the LAG setting in accordance with the fault cannot be performed appropriately in some cases. Furthermore, there may be the case where a fault which is difficult to be detected by the fault detecting unit described with reference to FIG. 7A and FIG. 8A occurs. For these reasons, in practice, it is desirable that the detection of a fault using the fault notification frame and the LAG setting described with reference to FIG. 7A and FIG. 8A and the detection of a fault using the control frames CF1 and CF2 and the LAG setting described with reference to FIG. 3A, FIG. 4, FIG. 6 and others are performed in parallel.

In this case, when the LAG setting can be performed based on the fault notification frame, the LAG can be set at high speed. Also, even when the LAG setting cannot be performed based on the fault notification frame (for example, the process is finished without doing anything as described in FIG. 9), the LAG can be set based on the control frame CF1 (in other words, connection information table 15). When using the control frames CF1 and CF2, it is possible to detect the fault which is difficult to be detected by the fault detecting unit, and the LAG can be set appropriately even when faults occur at several places.

For example, the case where the link fault occurs also in the link LK[2,2] in the configuration of FIG. 3A is assumed. In this case, only the fabric switch FS[3] detects the number of three, and each port switch PS sets the LAG only to the fabric-switch port Pf[3] in accordance with this.

<<Configuration and Operation of Port Switch (Switching Device)>>

Figure 10:
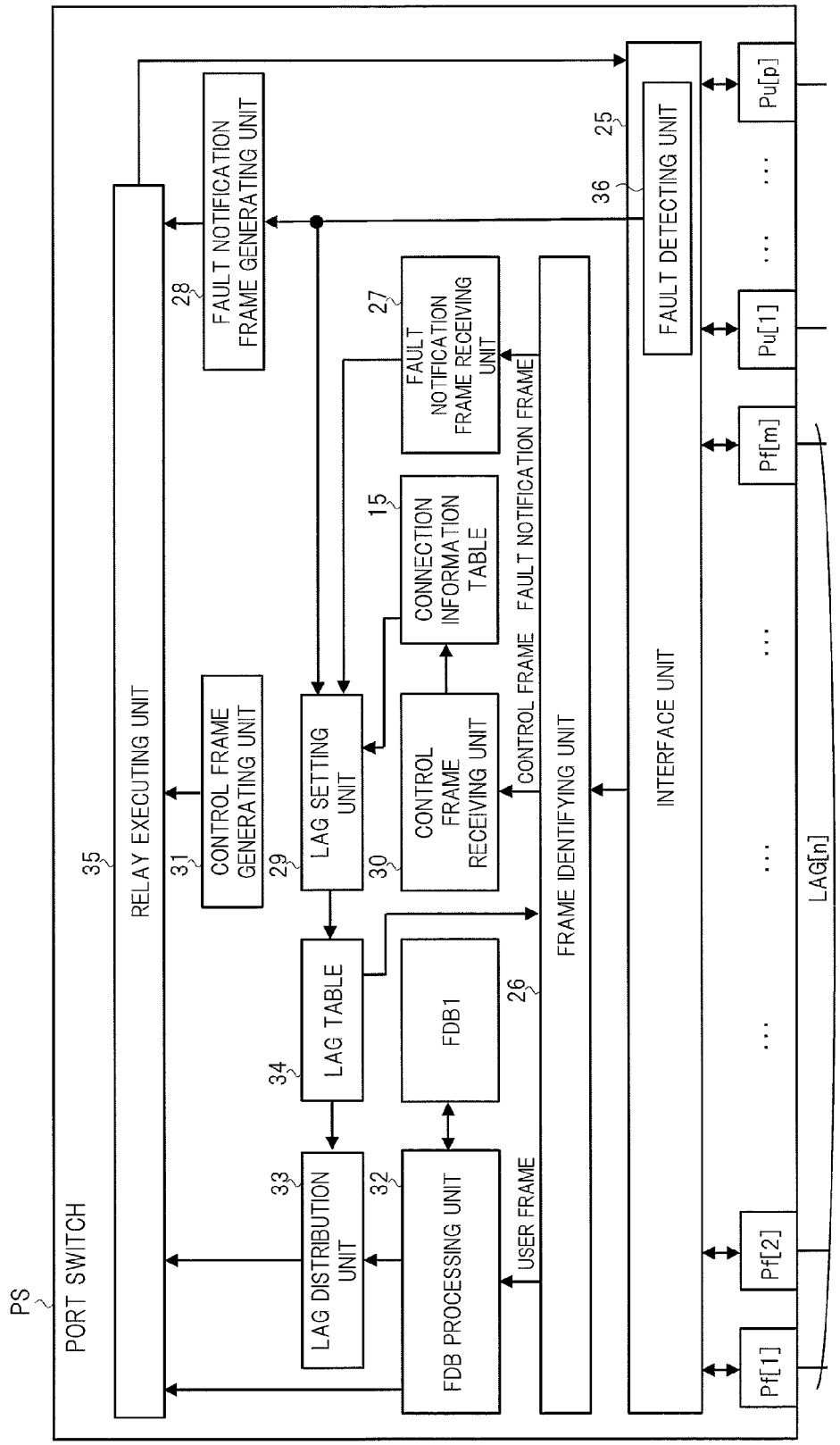
FIG. 10 is a block diagram showing a configuration example of a main part of the port switch in the relay system of FIG. 7A and FIG. 8A.

FIG. 10 is a block diagram showing a configuration example of a main part of the port switch in the relay system of FIG. 7A and FIG. 8A. FIG. 11A is a schematic diagram showing a configuration example of a LAG table in FIG. 10, and FIG. 11B is a schematic diagram showing a configuration example of an address table in FIG. 10. The port switch (switching device) PS shown in FIG. 10 includes a plurality of fabric-switch ports Pf[1] to Pf[m], a plurality of user ports Pu[1] to Pu[p], various processing units and various tables. The LAG[n] is set to the fabric-switch ports Pf[1] to Pf[m]. Hereinafter, the various processing units and various tables will be described.

An interface unit 25 includes a reception buffer and a transmission buffer, and transmits and receives a frame (user frame, control frame or fault notification frame) to and from a plurality of ports (Pf[1] to Pf[m] and Pu[1] to Pu[p]). The interface unit 25 includes a fault detecting unit (second fault detecting unit) 36 which detects a fault in the link connected to itself (that is, each fabric-switch port Pf) as described with reference to FIG. 7A and FIG. 8A. When the fault detecting unit 36 detects a fault, the fault detecting unit 36 transmits the fault link identifier representing the link having the fault to a fault notification frame generating unit 28 and a LAG setting unit 29.

A frame identifying unit 26 identifies whether the frame which has been received at any of the plurality of ports and transmitted through the reception buffer of the interface unit 25 is a user frame, a control frame or a fault notification frame. The user frame is a frame (FL1, FL2) transmitted from each terminal (TM1 to TM4) as shown in FIG. 1. The control frame is a frame for control (CF1, CF2) transmitted from the port switch PS and the fabric switch FS as shown in FIG. 2A, FIG. 6 and others. The fault notification frame is a frame for notifying a fault (DF1a to DF1c, DF2a) transmitted from the port switch PS and the fabric switch FS as shown in FIG. 7A and FIG. 8A.

The control frame and the fault notification frame can have a frame format of the Ethernet (registered trademark) like the user frame. For example, though not particularly limited, in the control frame CF1 transmitted from the fabric switch FS[1] of FIG. 2A, a MAC (Media Access Control) address of the fabric switch FS[1] is stored as a source MAC address, and a multicast MAC address corresponding to the plurality of port switches PS[1] to PS[3] is stored as a destination MAC address. Also, in the control frame CF1, a predetermined identifier indicating a control frame is stored as a frame type and the number of switches described above is stored in a data part.

Also, in the fault notification frame DF1a transmitted by the fabric switch FS[1] of FIG. 7A, a MAC address of the fabric switch FS[1] is stored as a source MAC address, and a multicast MAC address corresponding to the plurality of port switches PS[1] to PS[3] is stored as a destination MAC address. Furthermore, in the fault notification frame DF1a, a predetermined identifier indicating a fault notification frame is stored as a frame type and the above-described fault link identifier is stored in a data part.

Also, in the fault notification frame DF2a transmitted by the port switch PS[1] of FIG. 7A, a MAC address of the port switch PS[1] is stored as a source MAC address, and a multicast MAC address corresponding to the plurality of port switches PS[1] to PS[3] is stored as a destination MAC address. Furthermore, in the fault notification frame DF2a, a predetermined identifier indicating a fault notification frame is stored as a frame type and the fault link identifier is stored in a data part.

The frame identifying unit 26 identifies whether a frame is a user frame, a control frame or a fault notification frame based on the frame type. When the frame is a fault notification frame, the frame identifying unit 26 transmits the fault notification frame to a fault notification frame receiving unit 27. When the frame is a control frame, the frame identifying unit 26 transmits the control frame to a control frame receiving unit 30, and when the frame is a user frame, the frame identifying unit 26 transmits the user frame to a FDB processing unit 32. Also, at this time, the frame identifying unit 26 adds a port identifier of the port which has received the frame (reception port identifier) to the frame.

The fault notification frame receiving unit 27 determines whether the fault notification frame (first or second fault notification frame) is received at all of the links (that is, fabric-switch ports Pf) connected to itself. Then, when the fault notification frame is received at all of the links, the fault notification frame receiving unit 27 detects the fault link identifier contained in the fault notification frame and transmits it to the LAG setting unit 29. The LAG setting unit 29 sets the LAG based on the fault link identifier in the manner described with reference to FIG. 7A and FIG. 8A. In addition, the LAG setting unit 29 sets the LAG also when the fault link identifier is received from the fault detecting unit 36 like the case of the port switch PS[1] of FIG. 7A.

Concretely, the LAG setting unit 29 performs the setting of a LAG table 34 shown in FIG. 11A. The LAG table 34 of FIG. 11A retains the correspondence relation between the identifier {LAG[n]} of the LAG[n] and the port identifiers of the ports to which the LAG is set. For example, in the case of the port switch PS[2] of FIG. 7A, the LAG setting unit 29 performs the setting to associate {Pf[2]} and {Pf[3]} with {LAG[2]}. Also, in the case of the port switch PS[2] of FIG. 8A, the LAG setting unit 29 performs the setting to associate {Pf[1]} to {Pf[3]} with {LAG[2]}.

The fault notification frame generating unit (second fault notification frame generating unit) 28 generates a fault notification frame (second fault notification frame) containing a fault link identifier when a fault is detected by the fault detecting unit (second fault detecting unit) 36 like the case of the port switch PS[1] of FIG. 7A. At this time, the fault notification frame generating unit 28 adds a port identifier representing the destination port (destination port identifier) to the generated fault notification frame. The destination port identifier is {Pf[2]} and {Pf[3]} in the case of the port switch PS[1] of FIG. 7A. The fault notification frame generating unit 28 transmits the fault notification frame, to which the destination port identifier has been added, to a relay executing unit (second frame transmitting unit) 35.

The control frame receiving unit 30 detects the number of switches contained in the control frame from the frame identifying unit 26, and registers the number of switches to the connection information table 15 in association with the reception port identifier added to the control frame. As a result, the connection information table 15 retains the correspondence relation between the number of switches contained in the control frame and the port which has received the control frame as shown in FIG. 2B and FIG. 3B. The LAG setting unit 29 further detects the largest number of switches from the connection information table 15 and sets the LAG to the ports corresponding to the largest number of switches in addition to the above-described LAG setting based on the fault notification frame. More specifically, the LAG setting unit 29 sets the LAG table 34 as described above.

The FDB processing unit 32 performs the process (learning and retrieval) of an address table FDB1 shown in FIG. 11B for the user frame from the frame identifying unit 26. Concretely, the FDB processing unit 32 learns the correspondence relation between the source MAC address contained in the user frame and the port which has received the user frame (reception port identifier added by the frame identifying unit 26) in the address table FDB1. Also, the FDB processing unit 32 retrieves the destination port corresponding to the destination MAC address contained in the user frame from the address table FDB1.

The address table FDB1 shown in FIG. 11B retains the correspondence relation between the port identifier (for example, {Pu[1]}) and the MAC address (for example, MAxx) present ahead of the port corresponding to the port identifier. However, when the port corresponding to the port identifier is the port to which the LAG[n] is set (that is, fabric-switch port Pf), the address table FDB1 retains the identifier {LAG[n]} of the LAG[n] instead of the port identifier. For example, when the frame identifying unit 26 receives a user frame at a port to which the LAG[n] is set, the frame identifying unit 26 adds {LAG[n]} as the reception port identifier.

When the destination port acquired from the address table FDB1 is the user ports Pu[1] to Pu[P], the FDB processing unit 32 adds a destination port identifier to the user frame and transmits the user frame to the relay executing unit 35. Meanwhile, when the destination port is the port to which the LAG[n] is set, the FDB processing unit 32 transmits the user frame to a LAG distribution unit 33. The LAG distribution unit 33 recognizes the ports, to which the LAG[n] is set, based on the LAG table 34, and determines any of the ports (that is, fabric-switch port Pf) as the destination port based on a predetermined distribution rule. The LAG distribution unit 33 adds a destination port identifier to the user frame based on the destination port and transmits the user frame to the relay executing unit 35.

The control frame generating unit (second control frame generating unit) 31 generates the control frame (second control frame) CF2 for notifying the plurality of fabric switches FS of an identifier of its own port switch as described with reference to FIG. 6. Then, the control frame generating unit 31 adds a destination port identifier to the generated control frame CF2 and transmits the control frame CF2 to the relay executing unit 35. In the case of the port switch PS[1] of FIG. 6, the destination port identifier is {Pf[1]} to {Pf[3]}.

The relay executing unit 35 transmits the user frame from the FDB processing unit 32 or the LAG distribution unit 33 to a predetermined transmission buffer in the interface unit 25. The predetermined transmission buffer is a buffer corresponding to the destination port identifier added to the user frame. The transmission buffer in the interface unit 25 receives the user frame from the relay executing unit 35 and transmits the frame to the corresponding port.

Also, the relay executing unit (second frame transmitting unit) 35 transmits the fault notification frame (second fault notification frame) from the fault notification frame generating unit 28 and the control frame (second control frame) CF2 from the control frame generating unit 31 to a predetermined transmission buffer in the interface unit 25. In this case, since port identifiers of the plurality of fabric-switch ports Pf are added as the destination port identifier as described above, the transmission buffer corresponding thereto is selected. As a result, the fault notification frame (second fault notification frame) and the control frame (second control frame) CF2 are transmitted to the plurality of fabric switches FS through the interface unit 25.

<<Configuration and Operation of Fabric Switch>>

Figure 12:
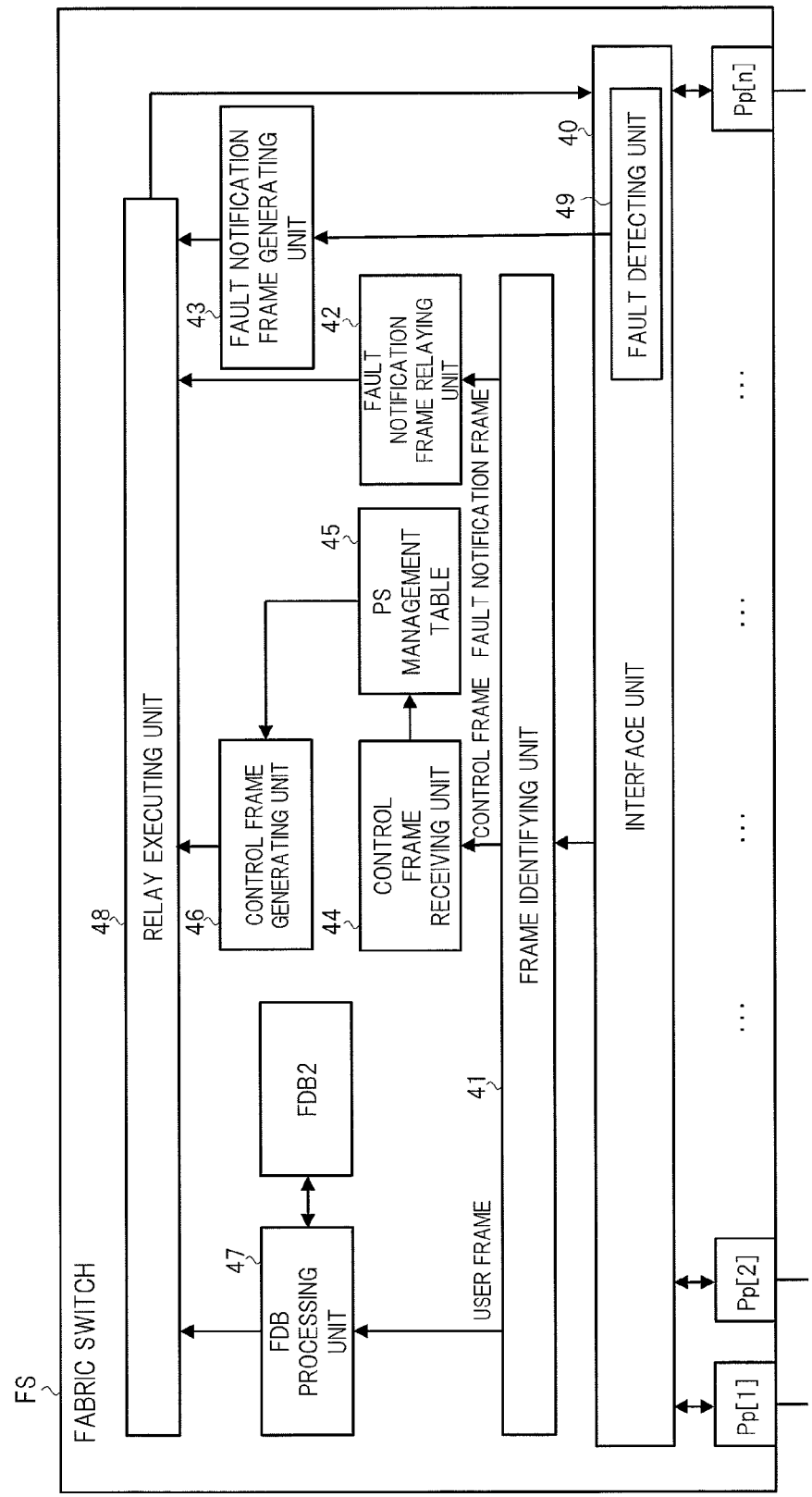
FIG. 12 is a block diagram showing a configuration example of a main part of the fabric switch in the relay system of FIG. 7A and FIG. 8A.

FIG. 12 is a block diagram showing a configuration example of a main part of the fabric switch in the relay system of FIG. 7A and FIG. 8A. FIG. 13A is a schematic diagram showing a configuration example of a PS management table in FIG. 12, and FIG. 13B is a schematic diagram showing a configuration example of an address table in FIG. 12. The fabric switch FS shown in FIG. 12 includes a plurality of port-switch ports Pp[1] to Pp[n], various processing units and various tables. Hereinafter, the various processing units and various tables will be described.

An interface unit 40 includes a reception buffer and a transmission buffer, and transmits and receives a frame (user frame, control frame or fault notification frame) to and from a plurality of port-switch ports Pp[1] to Pp[n]. The interface unit 40 includes a fault detecting unit (first fault detecting unit) 49 which detects a fault in the link connected to itself (that is, each port-switch port Pp) as described with reference to FIG. 7A and FIG. 8A. When the fault detecting unit 49 detects a fault, the fault detecting unit 49 transmits the fault link identifier representing the link having the fault to a fault notification frame generating unit 43.

A frame identifying unit 41 identifies whether the frame which has been received at any of the plurality of port-switch ports Pp[1] to Pp[n] and transmitted through the reception buffer of the interface unit 49 is a user frame, a control frame or a fault notification frame. Concretely, the frame identifying unit 41 identifies the frame based on the frame type or others like the case of FIG. 10.

When the frame is a fault notification frame (second fault notification frame), the frame identifying unit 41 transmits the fault notification frame to a fault notification frame relaying unit 42. Also, when the frame is a control frame, the frame identifying unit 41 transmits the control frame to a control frame receiving unit 44, and when the frame is a user frame, the frame identifying unit 41 transmits the user frame to a FDB processing unit 47. Also, at this time, the frame identifying unit 41 adds a reception port identifier to the frame like the case of FIG. 10.

A fault notification frame generating unit (first fault notification frame generating unit) 43 generates a fault notification frame (first fault notification frame) containing a fault link identifier when a fault is detected by the fault detecting unit (first fault detecting unit) 49 like the case of the fabric switch FS[1] of FIG. 7A. At this time, the fault notification frame generating unit 43 adds a port identifier representing the destination port (destination port identifier) to the generated fault notification frame. The destination port identifier is {Pp[2]} and {Pp[3]} in the case of the fabric switch FS[1] of FIG. 7A. The fault notification frame generating unit 43 transmits the fault notification frame (first fault notification frame), to which the destination port identifier has been added, to a relay executing unit (first frame transmitting unit) 48.

The fault notification frame relaying unit 42 adds a predetermined destination port identifier to the fault notification frame in order to flood the fault notification frame (second fault notification frame) from the frame identifying unit 41 like the case of the fabric switch FS[2] of FIG. 7A. In the case of the fabric switch FS[2] of FIG. 7A, the destination port identifier is {Pp[2]} and {Pp[3]}. The fault notification frame relaying unit 42 transmits the fault notification frame (second fault notification frame), to which the destination port identifier has been added, to the relay executing unit (first frame transmitting unit) 48.

The control frame receiving unit 44 detects the identifier of the port switch PS contained in the control frame from the frame identifying unit 41 (that is, control frame CF2 shown in FIG. 6), and sets the information thereof to a PS management table 45. As shown in FIG. 13A, the PS management table 45 retains the correspondence relation between the reception port identifier (for example, {Pp[1]}) added to the control frame (second control frame) CF2 and the identifier of the port switch PS (for example, {PS[1]}) contained in the control frame CF2. For example, when the control frame CF2 cannot be received within a predetermined period due to the fault, the control frame receiving unit 44 performs the process of deleting a corresponding entry in the PS management table 45 or adding information representing the invalidity of the entry to the entry.

A control frame generating unit (first control frame generating unit) 46 detects the number of port switches PS in a normal communication state based on the PS management table 45 and generates the control frame containing the number of switches (that is, CF1 of FIG. 2A and others). Then, the control frame generating unit 46 adds a predetermined destination port identifier to the generated control frame and transmits the control frame to the relay executing unit (first frame transmitting unit) 48. In the case of the fabric switch FS[1] of FIG. 2A, the destination port identifier is {Pp[1]} to {Pp[3]}.

The FDB processing unit 47 performs the process (learning and retrieval) of an address table FDB2 shown in FIG. 13B for the user frame from the frame identifying unit 41 like the case of FIG. 10. The address table FDB2 shown in FIG. 13B retains the correspondence relation between the port identifier (for example, {Pp[1]}) and a MAC address (for example, MAii or the like) present ahead of the port corresponding to the port identifier. The FDB processing unit 47 adds a destination port identifier acquired from the address table FDB2 to the user frame and transmits the user frame to the relay executing unit 48.

The relay executing unit 48 transmits the user frame from the FDB processing unit 47 to a predetermined transmission buffer in the interface unit 40. The predetermined transmission buffer is a buffer corresponding to the destination port identifier added to the user frame. The transmission buffer in the interface unit 40 receives the user frame from the relay executing unit 48 and transmits the frame to the corresponding port.

Also, the relay executing unit (first frame transmitting unit) 48 transmits the fault notification frame (first fault notification frame) from the fault notification frame generating unit 43 and the control frame (first control frame) CF1 from the control frame generating unit 46 to the predetermined transmission buffer in the interface unit 40. In this case, since port identifiers of the plurality of port-switch ports Pp are added as the destination port identifier as described above, the transmission buffer corresponding thereto is selected. As a result, the fault notification frame (first fault notification frame) and the control frame (first control frame) CF1 are transmitted to the plurality of port switches PS through the interface unit 40.

As described above, by using the relay system and the switching device of the first embodiment, typically, it is possible to achieve the speeding up of the automatic setting of the LAG in accordance with a fault. Note that, although the case where one link (for example, LK[1,1]) is provided between each port-switch port (for example, Pp[1]) and each fabric-switch port (for example, Pf[1]) is taken as an example in the embodiment described above, the present invention can be applied in the same manner even when a plurality of links are provided therebetween.

In this case, it is enough if the LAG setting unit and others are provided also in the fabric switch FS of FIG. 12 and both of the fabric switch FS and the port switch PS set the LAG to the plurality of links. With respect to the actual operation, for example, when faults occur in all of the plurality of links between the port-switch port Pp[1] and the fabric-switch port Pf[1], this is regarded as the fault of the link LK[1,1] and is treated in the same manner as the case of FIG. 3A and FIG. 7A. Meanwhile, when a part of the plurality of links is normal, the communication is reduced to the normal links, so that it is regarded that there is no fault as the link LK[1,1].

Second Embodiment

Operation in Setting LAG by Port Switch

Modified Example

Figure 14:
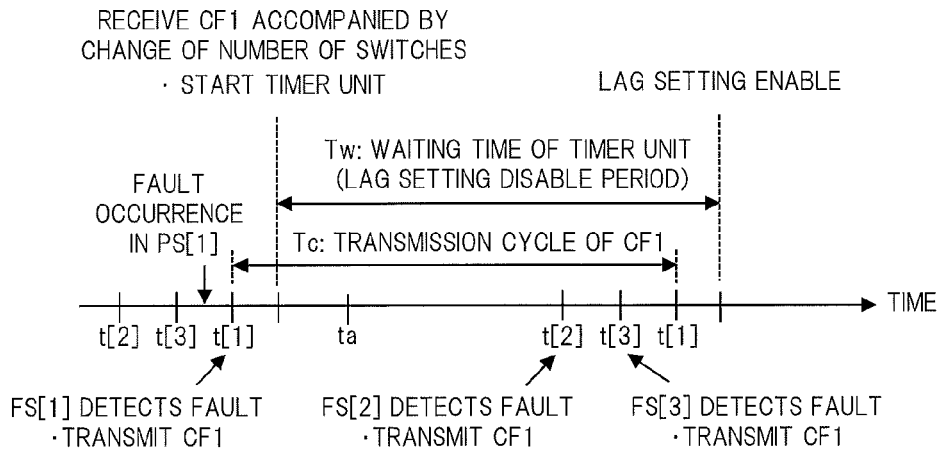
FIG. 14 is a timing chart showing an operation example insetting the LAG by the port switch in the relay system according to the second embodiment of the present invention.
Figure 15:
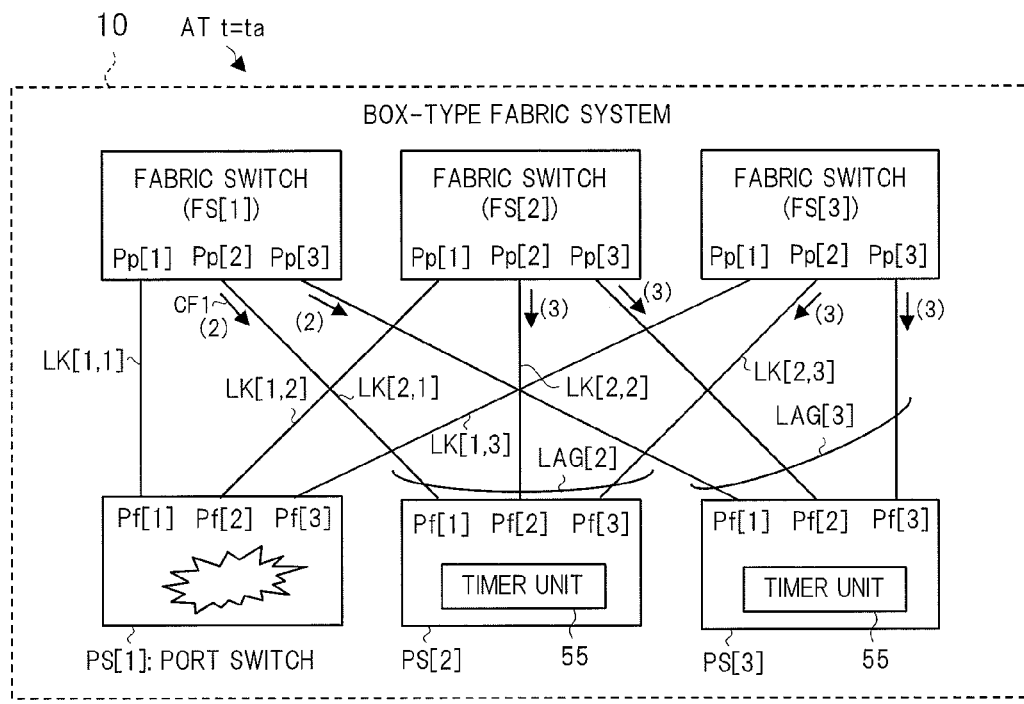
FIG. 15 is an explanatory diagram showing a configuration example of the relay system corresponding to FIG. 14 and an operation example of the relay system at a certain timing in FIG. 14.

FIG. 14 is a timing chart showing an operation example in setting the LAG by the port switch in the relay system according to the second embodiment of the present invention. FIG. 15 is an explanatory diagram showing a configuration example of the relay system corresponding to FIG. 14 and an operation example of the relay system at a certain timing in FIG. 14. FIG. 15 shows the relay system 10 including three fabric switches FS[1] to FS[3] and three port switches PS[1] to PS[3] like the case of FIG. 2A and others.

With respect to the LAG setting based on the connection information table 15 described above, the case where each of the fabric switches FS transmits the control frame CF1 at the same timing (for example, timing t1 of FIG. 5) is taken as an example in FIG. 5 and others of the first embodiment. However, in practice, each of the fabric switches FS transmits the control frame CF1 at respectively independent timings as shown in FIG. 14.

In FIG. 14, timings t[1] to t[3] represent the fault detection timings and the transmission timings of the control frame CF1 of the fabric switches FS[1] to FS[3], respectively. As shown in FIG. 14, in practice, there is the case where the timings t[2], t[3] and t[1] sequentially occur in this order with predetermined time lags, and then the timings t[2], t[3] and t[1] sequentially occur in this order with predetermined time lags again after the elapse of a predetermined period (first period) Tc.

In such a situation, the case where a fault of the port switch PS[1] occurs between the timing t[3] and the timing t[1] is assumed. In this case, as shown in FIG. 14 and FIG. 15, the fabric switch FS[1] first transmits the control frame CF1 containing the number of switches (two) in accordance with the fault of the port switch PS[1] to the port switches PS[2] and PS[3] at the timing t[1].

Upon reception of the control frame CF1, usually, the port switches PS[2] and PS[3] eliminate the fabric-switch port Pf[1] from the LAG. As shown in FIG. 14, the fabric switches FS[2] and FS[3] transmit the control frame CF1 containing the number of switches (two) in accordance with the fault of the port switch PS[1] to the port switches PS[2] and PS[3] at the timings t[2] and t[3] after the elapse of approximately the first period Tc from the timing t[1]. Upon reception of this, the port switches PS[2] and PS[3] return the fabric-switch port Pf[1], which has been eliminated from the LAG, to the LAG again.

In order to prevent the wasteful LAG setting like this, it is beneficial to provide a timer unit 55 in each of the port switches PS[1] to PS[3] as shown in FIG. 15. As shown in FIG. 14, when the control frame CF1 accompanied by the change of the number of switches is received (in other words, when the number of switches retained in the above-described connection information table 15 is changed), the timer unit 55 counts a second period Tw and enables the LAG setting after the elapse of the second period Tw. As can be seen from FIG. 14, the second period Tw is equal to or longer than the first period Tc, and is actually set to be twice or more as long as the first period Tc in consideration of a certain amount of margin.

However, when the timer unit 55 like this is provided, it becomes more difficult to achieve the speeding up of the automatic setting of the LAG in accordance with a fault. For its solution, by using the LAG setting based on the fault notification frame described in the first embodiment in combination, the speeding up of the automatic setting of the LAG can be achieved even when the timer unit 55 is provided in the above-described manner.

Configuration of Port Switch (Switching Device

Modified Example

Figure 16:
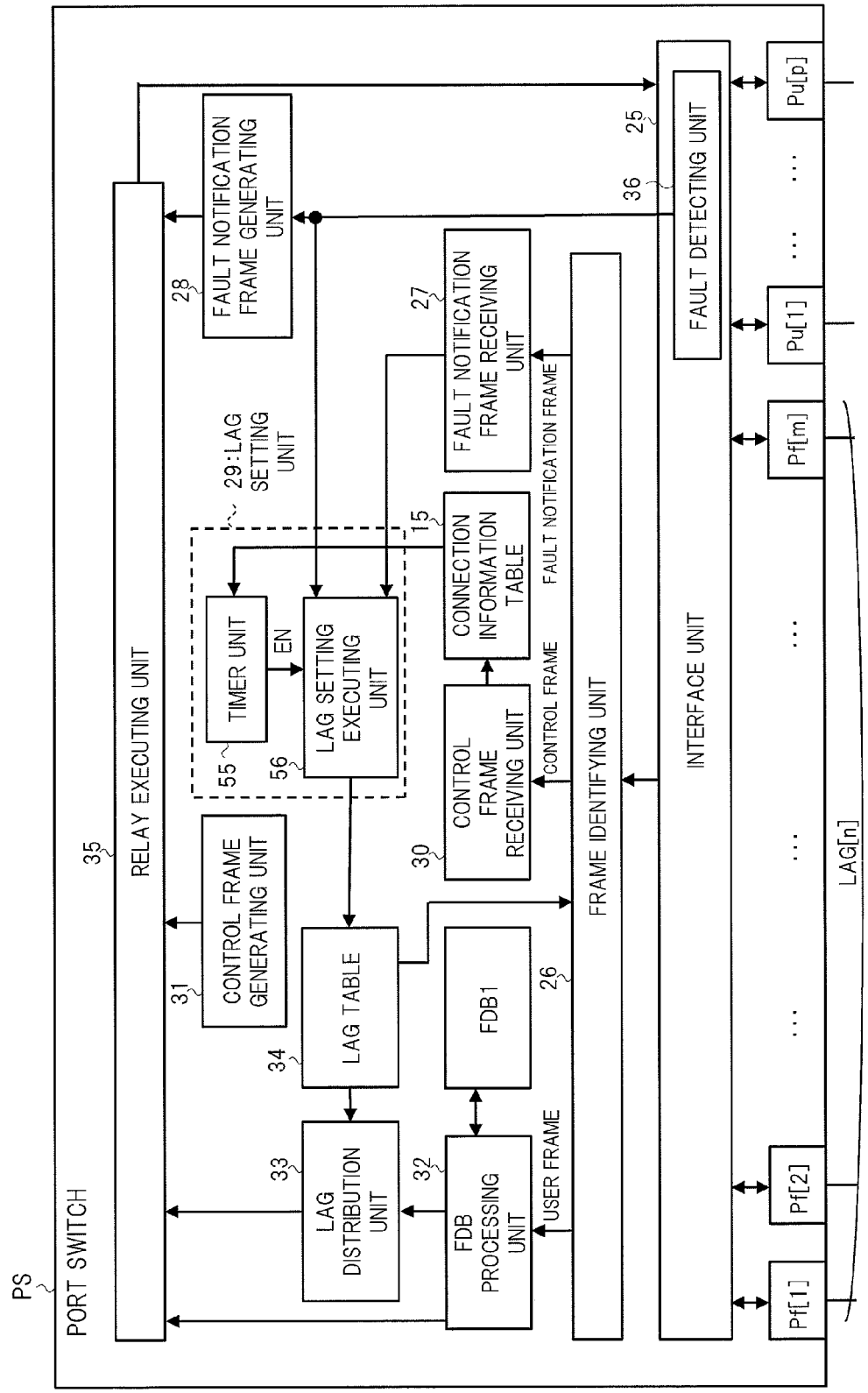
FIG. 16 is a block diagram showing a configuration example of a main part of the port switch in the relay system of FIG. 15.

FIG. 16 is a block diagram showing a configuration example of a main part of the port switch in the relay system of FIG. 15. The port switch PS shown in FIG. 16 has a different internal configuration of the LAG setting unit 29 in comparison with the configuration example shown in FIG. 10. Since the configuration other than that is the same as that of the case of FIG. 10, the detail description thereof will be omitted. Unlike the case of FIG. 10, when the number of switches retained in the connection information table 15 is changed, the LAG setting unit 29 of FIG. 16 sets the LAG based on the connection information table 15 after the elapse of the second period Tw.

Concretely, the LAG setting unit 29 of FIG. 16 includes the timer unit 55 and a LAG setting executing unit 56. The timer unit 55 counts the second period Tw which is equal to or longer than the first period Tc when the number of switches retained in the connection information table 15 is changed, and generates an enable signal EN after the elapse of the second period Tw. The LAG setting executing unit 56 sets the LAG based on the connection information table 15 in accordance with the enable signal EN. Note that, like the case of the LAG setting unit 29 of FIG. 10, the LAG setting executing unit 56 performs also the setting of the LAG based on the fault notification frame regardless of the timer unit 55.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail so as to make the present invention easily understood, and the present invention is not limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

For example, although a box-type fabric system is taken as an example, the method of the present embodiments can be applied also as an internal fault countermeasure function of a chassis-type switching device including a plurality of line cards and a fabric card provided to relay a frame between the plurality of line cards depending on the cases.

What is claimed is:

1. A relay system, comprising:
a plurality of port switches; and
a plurality of fabric switches functioning to relay a frame between the plurality of port switches,
wherein each of the plurality of port switches is connected to each of the plurality of fabric switches by links,
each of the plurality of fabric switches is configured to:
detect a fault of links connected to itself;
when a fault is detected, generate a first fault notification frame containing a fault link identifier representing a link having the fault; and
transmit the first fault notification frame to the plurality of port switches, and flood a second fault notification frame when the second fault notification frame is received from any of the plurality of port switches,
each of the plurality of port switches is configured to:
detect a fault of links connected to itself;
when a fault is detected, generate the second fault notification frame containing a fault link identifier representing a link having the fault;
transmit the second fault notification frame to the plurality of fabric switches; and
when the first fault notification frame or the second fault notification frame is received at all of links connected to itself, set LAG to the links connected to itself based on the fault link identifier contained in the received fault notification frame.

2. The relay system according to claim 1,
wherein, when the first fault notification frame is received at one of the links connected to itself and the second fault notification frame is received at other remaining links, and all of the fault link identifiers contained in the received fault notification frames are the same, the each of the plurality of port switches sets LAG to the remaining links.

3. The relay system according to claim 1,
wherein, when the first fault notification frame is received at all of the links connected to itself and all of the fault link identifiers contained in the received fault notification frames correspond to the same port switch, the each of the plurality of port switches sets LAG to all of the links connected to itself.

4. The relay system according to claim 1,
wherein each of the plurality of fabric switches is further configured to:
detect the number of port switches in a normal communication state based on a reception state of a second control frame from the plurality of port switches, and generate a first control frame containing the number of switches for each first period, and
transmit the first control frame generated for each first period to the plurality of port switches in addition to the first fault notification frame,
each of the plurality of port switches is further configured to:
generate the second control frame for each first period, and
transmit the second control frame generated for each first period to the plurality of fabric switches in addition to the second fault notification frame,
when the first control frame is received, the connection information table retains a correspondence relation between the number of switches contained in the first control frame and the link which has received the first control frame,
the each of the plurality of port switches detects the largest number of switches from the connection information table and sets the LAG to the links corresponding to the largest number of switches in addition to the setting of the LAG based on the fault notification frame, and
the each of the plurality of port switches and the each of the plurality of fabric switches detects the fault in a period shorter than the first period.

5. The relay system according to claim 4,
wherein the each of the plurality of port switches counts a second period which is equal to or longer than the first period, and when the number of switches retained in the connection information table is changed, sets the LAG based on the connection information table after elapse of the second period.

6. A switching device serving as one of a plurality of switching devices each connected to each of a plurality of fabric switches through links,
wherein, when each of the plurality of fabric switches detects a fault of links connected to itself, the fabric switch transmits a first fault notification frame containing a fault link identifier representing a link having the fault to the switching device, and when each of the plurality of fabric switches receives a second fault notification frame from the switching device, the fabric switch floods the second fault notification frame,
the switching device is configured to:
detect a fault of links connected to itself;
when a fault is detected by the fault detecting unit, generate the second fault notification frame containing a fault link identifier representing a link having the fault;
transmit the second fault notification frame to the plurality of fabric switches; and
when the first fault notification frame or the second fault notification frame is received at all of the links connected to itself, set LAG to the links connected to itself based on the fault link identifier contained in the received fault notification frame.

7. The switching device according to claim 6,
wherein, when the first fault notification frame is received at one of the links connected to itself and the second fault notification frame is received at other remaining links, and all of the fault link identifiers contained in the received fault notification frames are the same, the each of the plurality of port switches sets LAG to the remaining links.

8. The switching device according to claim 6,
wherein, when the first fault notification frame is received at all of the links connected to itself and all of the fault link identifiers contained in the received fault notification frames correspond to the same switching device, the each of the plurality of port switches sets LAG to all of the links connected to itself.

9. The switching device according to claim 6,
wherein each of the plurality of fabric switches further detects the number of switching devices in a normal communication state based on a reception state of a second control frame from the plurality of switching devices, and generates a first control frame containing the number of switches for each first period and transmits it to the switching device,
the switching device further includes:

a connection information table which, when the first control frame is received, retains a correspondence relation between the number of switches contained in the first control frame and the link which has received the first control frame, the switching device is further configured to:

generate the second control frame for each first period, transmit the second control frame generated for each first period to the plurality of fabric switches in addition to the second fault notification frame, detect the largest number of switches from the connection information table and set the LAG to the links corresponding to the largest number of switches in addition to the setting of the LAG based on the fault notification frame, and detect a fault in a period shorter than the first period.

10. The switching device according to claim 9, wherein the switching device counts a second period which is equal to or longer than the first period, and when the number of switches retained in the connection information table is changed, sets the LAG based on the connection information table after elapse of the second period.

\* \* \* \* \*